(12) United States Patent
Todd et al.

(10) Patent No.: US 9,387,935 B2
(45) Date of Patent: Jul. 12, 2016

(54) AIRCRAFT POWER DISTRIBUTION NETWORK

(75) Inventors: Timothy Todd, Bristol (GB); Thorsten Nitsche, Gruenendeich (DE)

(73) Assignees: AIRBUS OPERATIONS LIMITED, Bristol (GB); AIRBUS OPERATIONS GMBH, Hamburg (DE)

(*) Notice: Subject to any disclaimer, the term of this patent is extended or adjusted under 35 U.S.C. 154(b) by 479 days.

(21) Appl. No.: 13/821,721

(22) PCT Filed: Sep. 8, 2011

(86) PCT No.: PCT/EP2011/065581
§ 371 (c)(1),
(2), (4) Date: Mar. 8, 2013

(87) PCT Pub. No.: WO2012/038266
PCT Pub. Date: Mar. 29, 2012

(65) Prior Publication Data
US 2013/0169036 A1    Jul. 4, 2013

(30) Foreign Application Priority Data

Sep. 21, 2010 (GB) .................................. 1015760.0

(51) Int. Cl.
*B64D 33/00* (2006.01)
*H02J 4/00* (2006.01)
*H02J 9/06* (2006.01)

(52) U.S. Cl.
CPC . *B64D 33/00* (2013.01); *H02J 4/00* (2013.01); *H02J 9/061* (2013.01); *B64D 2221/00* (2013.01); *H02J 2009/068* (2013.01)

(58) Field of Classification Search
CPC ....... B64D 33/00; B64D 2221/00; H02J 4/00; H02J 9/061; H02J 2009/068; Y02T 10/7005; Y02T 10/7077; B60R 16/03; B60R 16/0315; B60L 11/14

USPC .......................................................... 307/9.1
See application file for complete search history.

(56) References Cited

U.S. PATENT DOCUMENTS

| | | | |
|---|---|---|---|
| 4,400,626 A | 8/1983 | Lacy | |
| 6,172,552 B1 * | 1/2001 | Tamai | H03K 17/6874 327/427 |

(Continued)

FOREIGN PATENT DOCUMENTS

| | | |
|---|---|---|
| CN | 101529686 A | 9/2009 |
| CN | 101541602 A | 9/2009 |

(Continued)

OTHER PUBLICATIONS

Notification of the First Office Action and Search Report dated Nov. 15, 2014 in corresponding Chinese Application No. 201180045019.2.

(Continued)

*Primary Examiner* — Thienvu Tran
*Assistant Examiner* — Brian K Baxter
(74) *Attorney, Agent, or Firm* — Hauptman Ham, LLP

(57) ABSTRACT

An aircraft power distribution network comprising first and second galvanically isolated power bus bars, and first and second remote data concentrators (RDCs), each RDC having an input/output interface (I/O) and a power supply, the first RDC power supply being connected to the first power bus bar, the second RDC power supply being connected to the second power bus bar, an input/output device being connected to the I/O of the first RDC and to the I/O of the second RDC, each RDC being adapted to supply electrical power to the input/output device through its respective I/O, wherein each RDC includes a switch for isolating the input/output device, and the switches being operatively coupled such that electrical power cannot be supplied to the input/output device by both RDCs simultaneously. Also, a method of operating the network.

16 Claims, 3 Drawing Sheets

(56) References Cited

U.S. PATENT DOCUMENTS

| | | | | |
|---|---|---|---|---|
| 8,275,494 | B1* | 9/2012 | Roth | H04L 12/40013 244/75.1 |
| 8,657,227 | B1* | 2/2014 | Bayliss | H02J 4/00 244/134 D |
| 2003/0047997 | A1* | 3/2003 | Bernier | B64D 41/00 307/9.1 |
| 2006/0062143 | A1* | 3/2006 | Bibby | G05D 1/0077 370/225 |
| 2010/0091521 | A1* | 4/2010 | Hinds | H02J 9/061 363/15 |
| 2010/0102625 | A1* | 4/2010 | Karimi | B60L 1/00 307/9.1 |
| 2012/0235470 | A1* | 9/2012 | Prisse | H02J 3/26 307/9.1 |

FOREIGN PATENT DOCUMENTS

| | | |
|---|---|---|
| EP | 1099630 A2 | 5/2001 |
| EP | 1860408 A1 | 11/2007 |

OTHER PUBLICATIONS

Search Report issued in Application No. GB1015760.0 on Mar. 23, 2011.

* cited by examiner

AIRCRAFT POWER DISTRIBUTION NETWORK

RELATED APPLICATIONS

The present application is a National Phase of PCT/EP2011/065581, filed Sep. 8, 2011 and is based on, and claims priority from, Great Britain Application No. 1015760.0, filed Sep. 21, 2010.

FIELD OF THE INVENTION

The present invention relates to an aircraft power distribution network, and to a method of operating the network.

BACKGROUND OF THE INVENTION

Modem aircraft typically include a great number of sensors, effectors, etc., connected to an avionics network having a central processor. The sensors, effectors, etc. are typically line replaceable units (LRUs) to improve operational effectiveness. The LRUs are typically concentrated at particular locations in the aircraft where systems are installed. To reduce wiring, and therefore weight, a remote data concentrator (RDC) may be used to connect several of the LRUs to the avionics network.

To reduce design and manufacturing costs, and to improve operational effectiveness, all of the RDCs on a particular aircraft may be standardised, regardless of the LRUs to which they are connected. The RDCs may therefore have common hardware, and so are known as common remote data concentrators (cRDCs). The cRDCs may include configurable software. Standardisation of the cRDC makes it possible to hold an inventory of fewer parts, such that a defective cRDC can be readily replaced during routine maintenance tasks, thereby improving operational effectiveness.

The RDCs are connected to the aircraft power distribution by power bus bars. For redundancy, commercial airliners typically have at least two independent bus bars, one running along each side of the aircraft fuselage. Each bus bar has the capacity to carry all power to/from the RDCs in the event of failure of an entire side of the avionics architecture. For greater redundancy an aircraft may have more than two bus bars, some of which are emergency bus bars to replicate the two main bus bars.

Traditional avionics architecture design rules have required complete segregation between the bus bars, and redundancy for each LRU. Segregation is required to prevent failure propagating from one bus bar to the other. Therefore, for any given LRU, e.g. a sensor, connected via an RDC to one bus bar there needs to be an identical, redundant LRU connected via another RDC to the other bus bar. Modern sensors/effectors are very reliable, sometimes more so than the avionics network to which they are connected. If a particular aircraft sensor/effector is deemed to be sufficiently reliable (low sensitivity) then it may be possible to design the avionics architecture such that that particular sensor/effector has no redundant pair. However, there remains the problem that a single sensor/effector still needs to be connected to both bus bars on each side of the aircraft, and these bus bars must still be completely segregated.

An alternative "non-standard" approach is to design the RDC with a "double lane" architecture, whereby a single sensor/effector connected to an RDC is linked to either the first bus bar, or the second bus bar, at any instance with mechanical relay switching between the two. The mechanical switching relay can satisfy the requirements for isolating the two bus bars, whilst providing a reduction in the number of sensors/effectors and RDCs on the aircraft, giving considerable weight saving and reduced emissions. However, this "double lane" architecture for the RDC is non-standard and each RDC generally has to be designed differently according to its location and connections on the aircraft. The considerable benefits of a flexible, simplex, integrated modular electronics architecture (IMA) using cRDCs cannot therefore be realised.

SUMMARY OF THE INVENTION

A first aspect of the invention provides an aircraft power distribution network comprising first and second galvanically isolated power bus bars, and first and second remote data concentrators (RDCs), each RDC having an input/output interface (I/O) and a power supply, the first RDC power supply being connected to the first power bus bar, the second RDC power supply being connected to the second power bus bar, an input/output device being connected to the I/O of the first RDC and to the I/O of the second RDC, each RDC being adapted to supply electrical power to the input/output device through its respective I/O, wherein each RDC includes a switch for isolating the input/output device, and the switches being operatively coupled such that electrical power cannot be supplied to the input/output device by both RDCs simultaneously.

A further aspect of the invention provides a method of operating an aircraft power distribution network, the aircraft power distribution network comprising first and second galvanically isolated power bus bars, and first and second remote data concentrators (RDCs), each RDC having an input/output interface (I/O) and a power supply, the first RDC power supply being connected to the first power bus bar, the second RDC power supply being connected to the second power bus bar, an input/output device being connected to the I/O of the first RDC and to the I/O of the second RDC, each RDC being adapted to supply electrical power to the input/output device through its respective I/O, wherein each RDC includes a switch for isolating the input/output device, and the switches being operatively coupled; the method comprising operating the RDCs to autonomously control the switches such that electrical power cannot be supplied to the input/output device by both RDCs simultaneously.

The invention is advantageous in that the first and second RDCs can have identical hardware, and so can form part of a flexible, simplex, integrated modular electronics architecture (IMA), whilst the autonomous switching enables either one of the RDCs to isolate the input/output device such that the input/output device can only receive electrical power from one of the RDCs at any instance, thereby achieving the requisite isolation between the two power bus bars. When embedded in an avionics network, fewer input/output devices (e.g. LRUs) and fewer RDCs are required compared with the prior art. In addition, the RDCs can have common hardware and so common RDCs (cRDCs) can be used in the avionics architecture.

Each RDC may include exclusive OR logic for controlling its respective switch.

The logic may be implemented in hardware in each RDC. The hardware may be any suitable hardware based solution, such as a programmable logic device (PLD), or a solid state relay/switch arrangement, for example. The hardware based solution is preferably a simple and fully testable logic chip, devoid of software (which is considered "complex" and therefore not fully testable in the aviation industry). Weight saving and improved reliability may be achieved through use of solid state hardware, rather than mechanical switching relays. The switching of solid state hardware is also much faster than traditional mechanical relay switching, so reducing the time that the two bus bars could potentially be connected.

The I/O of the first RDC may be operatively coupled to the logic of the second RDC, and the I/O of the second RDC may be operatively coupled to the logic of the first RDC.

The logic of the second RDC may be operable to detect the status of the switch in the first RDC, and the logic of the first RDC may be operable to detect the status of the switch in the second RDC.

The power supply of the first RDC may be isolated from the second RDC, and the power supply of the second RDC may be isolated from the first RDC.

One of the first and second RDCs may be designated as master, and the other as slave, for defining a priority to supply electrical power to the input/output device.

Each RDC may have a plurality of I/Os, and the switch in each RDC may be operable to isolate two or more of its plurality of I/Os. Each RDC may have banks of I/Os, and each bank may be isolated by a respective switch. Alternatively, each RDC may have a plurality of I/Os, and each I/O may have a respective switch for isolating the I/O.

Each RDC may be connected between an analogue, discrete or field bus (e.g. CAN, ARINC 429, FlexRay) on a network interface side of the RDC, and an aircraft data network (e.g. ARINC 664, or any future aircraft data network) on the I/O side.

Also, an aircraft including the aircraft power distribution network, which forms part of an avionics network.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
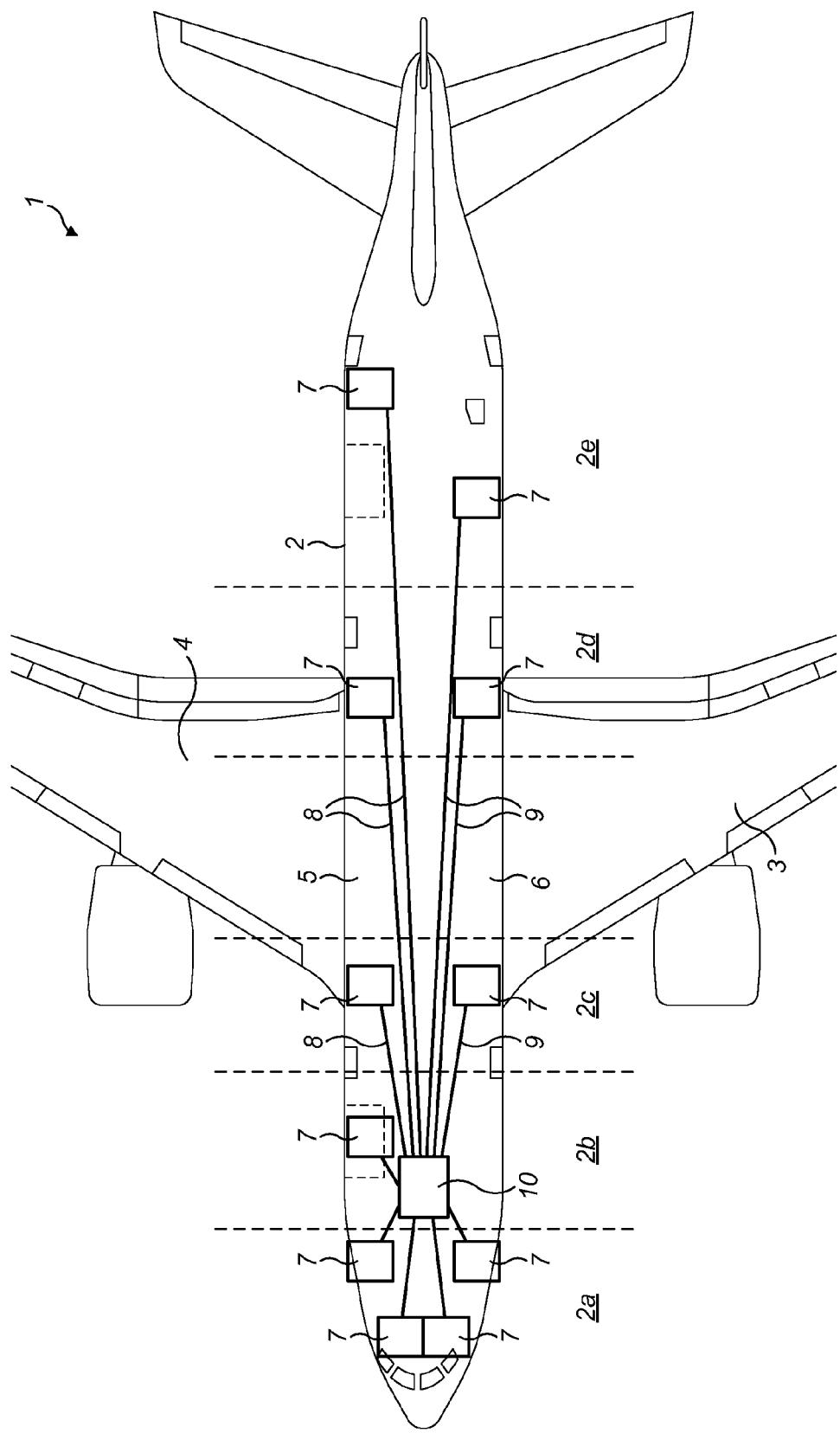
FIG. 1 illustrates schematically an avionics network installed in an aircraft.

FIG. 1 illustrates a plan view of an aircraft 1 having a fuselage 2, wings 3, 4 and an avionics network including two segregated wiring routes 5, 6 running along either side of the fuselage 2. The wire routes 5, 6 include power buses, data buses, signal routes etc. The wire routes 5, 6 are grouped on first and second sides of the aircraft 1 to form first side wire routes 5 and second side wire routes 6. The first and second side wire routes 5, 6 are segregated to ensure that no single side failure affects the other.

The fuselage 2 is split into a plurality of segments:—nose fuselage 2a, forward fuselage to 2b, centre fuselage (forward of wingbox) 2c, centre fuselage (aft of wingbox) 2d, and aft fuselage 2e. In each of these fuselage segments there is located groups of common remote data concentrators (cRDCs) 7 on either side of the fuselage 2.

The location and grouping of the cRDCs 7 is dependent upon the location of various electronic sensors, effectors, etc. that need to be connected to the avionics network. The cRDCs 7 on the right side of the fuselage 2 are connected to wiring routes 5 and the cRDCs 7 on the left side of the fuselage 2 are connected to wiring routes 6.

The cRDCs 7 on the right side of the fuselage 2 are connected via first power bus bar 8 in wiring routes 5 to power distribution 10, and the cRDCs 7 on the left side of the fuselage 2 are connected via second power bus bar 9 in wiring routes 6 to power distribution 10.

Figure 2:
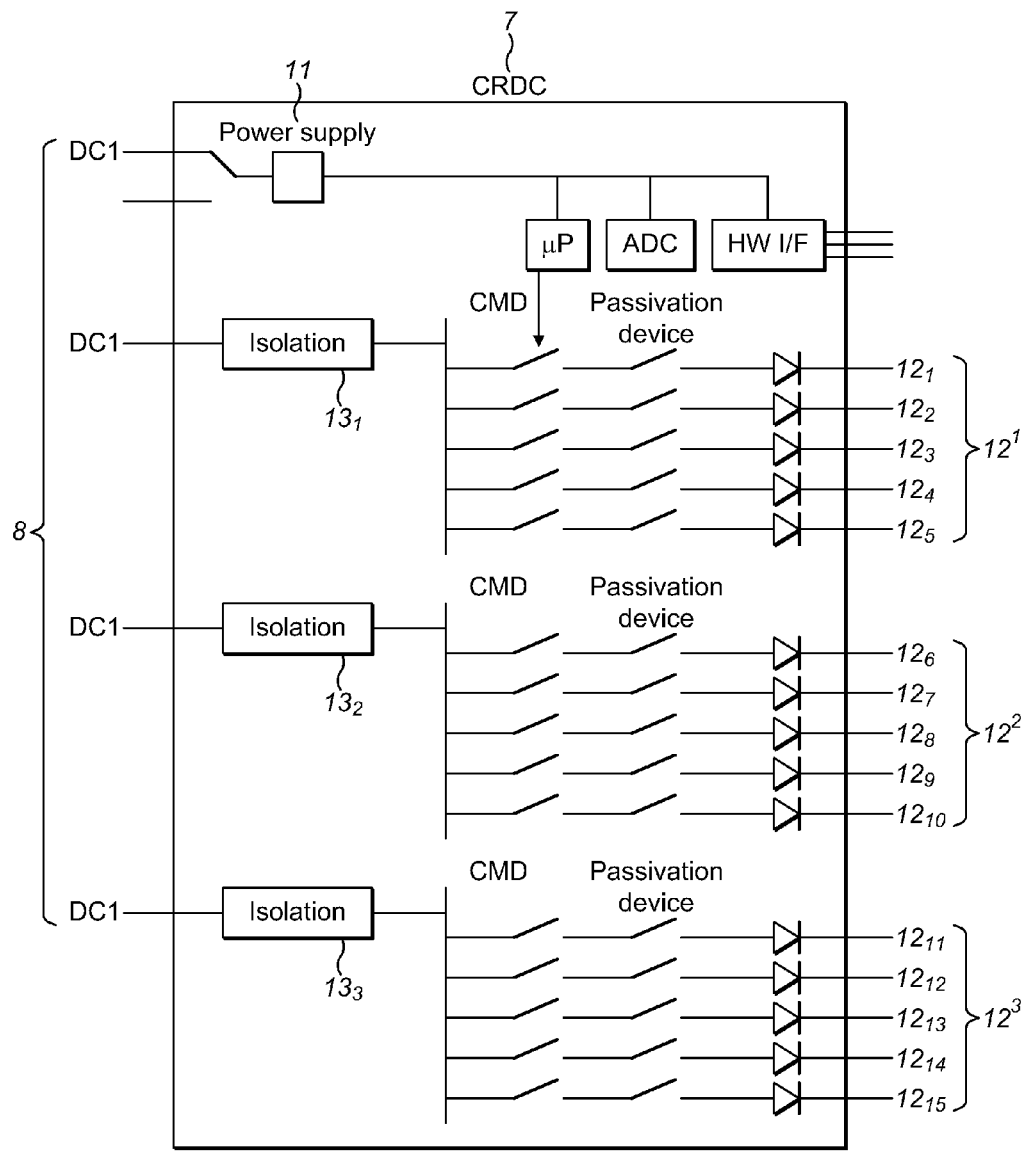
FIG. 2 illustrates schematically the power distribution within one of the RDCs of the avionics network, having a power supply for connection to a power bus bar and having banks of I/O interfaces each selectively isolated from the power bus bar.

FIG. 2 illustrates schematically the power distribution within one of the cRDCs 7. The cRDC 7 includes a power supply 11 for connection to the first power bus bar 8, which provides power to all cRDC hardware and interfaces. The cRDC 7 has a plurality of I/O interfaces (I/O) $12_1$-$12_{15}$ for connection to input/output devices such as sensors, effectors, etc. which form part of the avionics network. The input/output devices may be Line Replaceable Units (LRUs).

The I/O 12 may be, for example, 28V/OPN DSO interfaces. The cRDC 7 provides power to the input/output devices via the I/O interfaces 12. The I/O interfaces 12 are arranged in three banks $12^1$, $12^2$, $12^3$ and each is individually powered from power bus bar 8. The banks of I/O $12^1$-$12^3$ are isolated by dedicated isolation $13^1$, $13^2$, $13^3$ respectively. The isolation 13 will now be described in greater detail with reference to FIG. 3.

Figure 3:
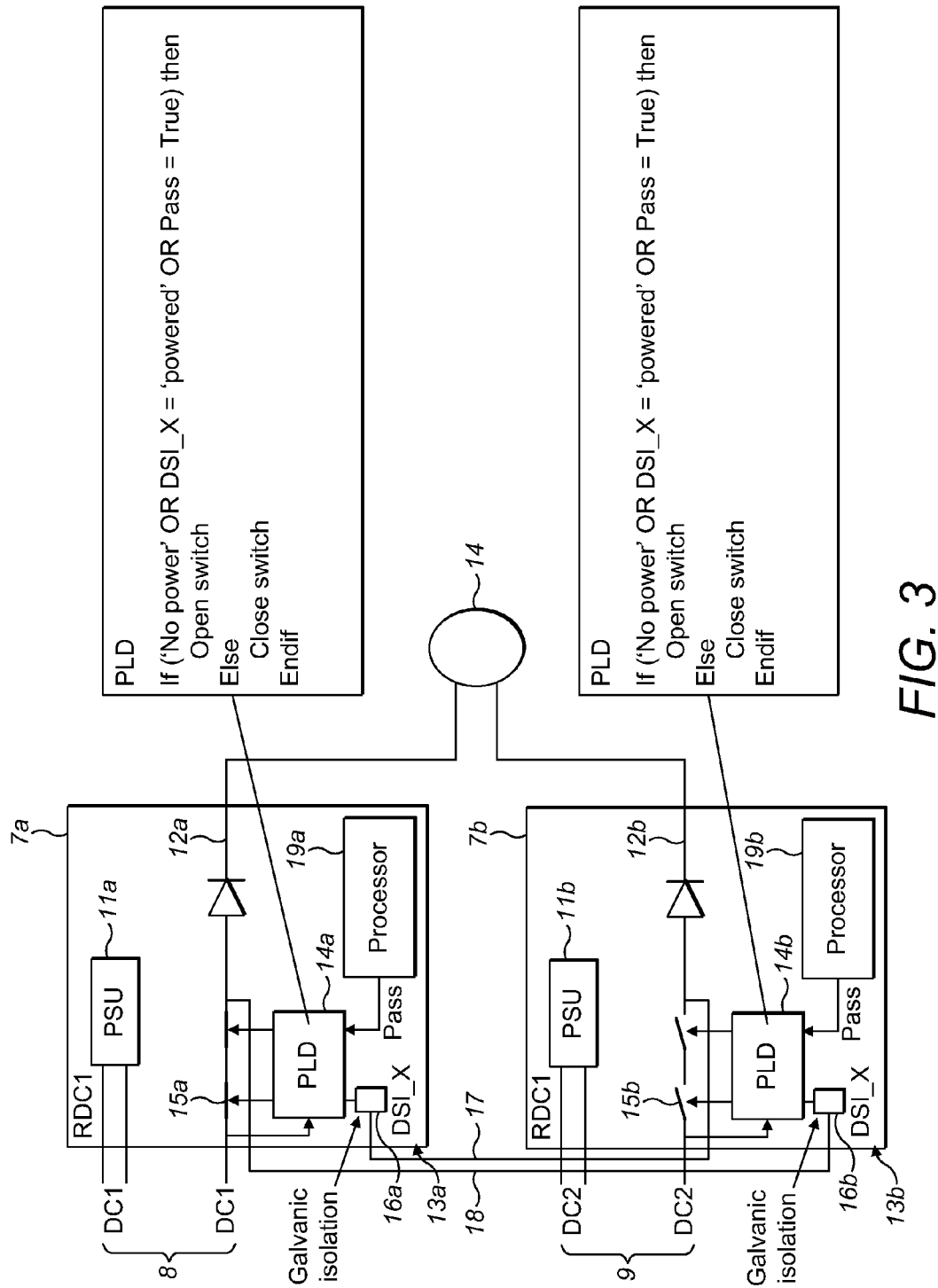
FIG. 3 illustrates schematically first and second RDCs connected to respective galvanically isolated power bus bars, and showing in detail the isolation for respective RDC I/O interfaces which are connected to a common input/output device.

FIG. 3 illustrates schematically first and second cRDCs 7a, 7b connected to their respective galvanically isolated power bus bars 8, 9. FIG. 3 has been simplified to show only one I/O 12a, 12b for each RDC 7a, 7b respectively. A single input/output device 14, such as a sensor, effector, etc., is connected to both the I/O 12a of the first cRDC 7a and the I/O 12b of the second cRDC 7b. The cRDCs 7a, 7b include respective power supplies 11a, 11b as described previously.

The isolation 13 indicated in FIG. 2 is shown in greater detail in FIG. 3. Each cRDC 7a, 7b includes respective isolation 13a, 13b for its respective I/O 12a, 12b. Each isolation 13a, 13b comprises a programmable logic device (PLD) 14a, 14b. The PLDs 14a, 14b define exclusive OR logic, and are fully testable (i.e. they are devoid of software).

The PLD 14a is connected to switch 15a in the first cRDC 7a, which when open provides isolation for the I/O 12a, and when closed can provide electrical power from the first bus bar 8 to the I/O 12a.

The PLD 14b is connected to switch 15b in the second cRDC 7a, which when open provides isolation for the I/O 12b, and when closed can provide electrical power from the second bus bar 9 to the I/O 12b.

The PLD 14a is powered from the first bus bar 8, and the PLD 14b is powered from the second bus bar 9. The PLD 14a of the first cRDC 7a has a discrete input (DSI_X) 16a operatively coupled to the I/O 12b of the second cRDC 7b by line 17. The discrete input 16a indicates to the PLD 14a whether the I/O 12b is powered, or not. The PLD 14b of the second cRDC 7b has a discrete input (DSI_X) 16b operatively coupled to the I/O 12a of the first cRDC 7a by line 18. The discrete input 16b indicates to the PLD 14b whether the I/O 12a is powered, or not. Each cRDC 7a, 7b has a respective processor 19a, 19b connected to its respective PLD 14a, 14b. The processors 19a, 19b contain a set of instructions for their respective cRDCs 7a, 7b. These instructions include a master/slave setting for the pair of cRDCs 7a, 7b. If the first cRDC 7a is set as master of the pair then cRDC 7b will be set as slave and vice versa. If the first cRDC 7a is set as master, then the default position for switch 15a is closed, and the default position for switch 15b is open. If the second cRDC 7b is set as master, then the default position for switch 15b is closed, and the default position for switch 15a is open.

Each PLD 7a, 7b includes the following exclusive OR logic:

```
If ( 'No power' OR DSI_X = 'Powered' OR Pass = True) then
    Open switch
Else
    Close switch
Endif
```

Therefore, if cRDC 7a is set as master and bus bar 8 is powered then switch 15a defaults to the closed position and I/O 12a is powered, and switch 15b is open so that I/O 12b is unpowered. If power bus bar 8 becomes unpowered and power bus bar 9 remains powered then switch 15a will open and switch 15b will close such that I/O 12b is powered, and I/O 12a becomes unpowered. Operation of input/output device 14 is uninterrupted despite the loss of power bus bar 8. The processors 19a, 19b provide instruction to respective passivation devices, which provide the primary instruction as to whether their respective I/O 12 is operational. If the processors 19a, 19b command their I/O 12a, 12b to be operational then the passivation device provides a "Pass=True" instruction to its PLD 14a, 14b. Only one of the processors 19a, 19b would normally be in control of driving the input/output device 14, but the isolation 13a, 13b provides fault protection in the case that both processors 19a, 19b attempt to command the input/output device 14 simultaneously.

If the master/slave relationship of the cRDC pair 7a, 7b is reversed then the default position of the switches 15a, 15b will reverse accordingly, if power is available from both of the power bus bars 8, 9.

Each cRDC will typically have a plurality of I/Os, and the switch in each RDC may be operable to isolate two or more of its plurality of I/Os. For example, each RDC may have banks of I/Os, and each bank may be isolated by a respective switch (as shown in FIG. 2). Alternatively, each RDC may have a plurality of I/Os, and each I/O may have a respective switch for isolating the I/O.

By using fast switching solid state hardware, rather than mechanical switching relays, the RDC pairs can provide the necessary segregation between the power bus bars, and can provide significant weight savings by reduction in the number of cRDCs and LRUs without loss of redundancy. Solid state switches are also more reliable than mechanical switches.

Although the invention has been described above with reference to one or more preferred embodiments, it will be appreciated that various changes or modifications may be made without departing from the scope of the invention as defined in the appended claims.

The invention claimed is:

1. An aircraft power distribution network comprising first and second galvanically isolated power bus bars, and first and second remote data concentrators (RDCs), each RDC having an input/output interface (I/O) and a power supply, the power supply of the first RDC being connected to the first galvanically isolated power bus bar, the power supply of the second RDC being isolated from the power supply of the first RDC and being connected to the second galvanically isolated power bus bar, an input/output device being connected to the I/O of the first RDC and to the I/O of the second RDC, each RDC being adapted to supply electrical power to the input/output device through its respective I/O, wherein each RDC includes a switch for isolating the input/output device, and the switches being operatively coupled such that electrical power cannot be supplied to the input/output device by both RDCs simultaneously.

2. An aircraft power distribution network according to claim 1, wherein each RDC includes exclusive OR logic for controlling its respective switch.

3. An aircraft power distribution network according to claim 2, wherein the exclusive OR logic is implemented in hardware in each RDC.

4. An aircraft power distribution network according to claim 3, wherein the I/O of the first RDC is operatively coupled to the exclusive OR logic of the second RDC, and the I/O of the second RDC is operatively coupled to the exclusive OR logic of the first RDC.

5. An aircraft power distribution network according to claim 4, wherein the exclusive OR logic of the second RDC is operable to detect the status of the switch in the first RDC, and the exclusive OR logic of the first RDC is operable to detect the status of the switch in the second RDC.

6. An aircraft power distribution network according to claim 1, wherein the power supply of the first RDC is isolated from the second RDC, and the power supply of the second RDC is isolated from the first RDC.

7. An aircraft power distribution network according to claim 1, wherein one of the first and second RDCs is designated as master, and the other as slave, for defining a priority to supply electrical power to the input/output device.

8. An aircraft power distribution network according to claim 1, wherein each RDC has a plurality of I/Os, and wherein the switch in each RDC is operable to isolate two or more of its plurality of I/Os.

9. An aircraft power distribution network according to claim 1, wherein each RDC has a plurality of I/Os, and wherein each I/O has a respective switch for isolating the I/O.

10. An aircraft power distribution network according to claim 1, where the or each switch in each RDC is a solid state relay.

11. An aircraft including the aircraft power distribution network of claim 1.

12. A method of operating an aircraft power distribution network, the aircraft power distribution network comprising first and second galvanically isolated power bus bars, and first and second remote data concentrators (RDCs), each RDC having an input/output interface (I/O) and a power supply, the power supply of the first RDC being connected to the first galvanically isolated power bus bar, the power supply of the second RDC being isolated from the power supply of the first RDC and being connected to the second galvanically isolated power bus bar, an input/output device being connected to the I/O of the first RDC and to the I/O of the second RDC, each RDC being adapted to supply electrical power to the input/output device through its respective I/O, wherein each RDC includes a switch for isolating the input/output device, and the switches being operatively coupled; the method comprising operating the RDCs to autonomously control the switches such that electrical power cannot be supplied to the input/output device by both RDCs simultaneously.

13. A method according to claim 12 further comprising using exclusive OR logic to control the switches.

14. A method according to claim 13, wherein the exclusive OR logic is implemented in hardware in each RDC.

15. A method according to claim 14, further comprising using the exclusive OR logic of the second RDC to detect the status of the switch in the first RDC, and using the exclusive OR logic of the first RDC to detect the status of the switch in the second RDC.

16. A method according to claim 12, further comprising designating one of the first and second RDCs as master, and the other as slave, for defining a priority to supply electrical power to the input/output device.

* * * * *